United States Patent [19]

Nachlas et al.

[11] Patent Number: 5,454,923
[45] Date of Patent: Oct. 3, 1995

[54] INERT GAS PURIFYING SYSTEM

[75] Inventors: Jesse A. Nachlas; Dale M. Taylor, both of Salt Lake City, Utah

[73] Assignee: Ceramatec, Inc., Salt Lake City, Utah

[21] Appl. No.: 23,565

[22] Filed: Feb. 26, 1993

Related U.S. Application Data

[63] Continuation-in-part of Ser. No. 842,920, Feb. 28, 1992, abandoned, which is a continuation-in-part of Ser. No. 710,128, Jun. 4, 1991, Pat. No. 5,378,345.

[51] Int. Cl.$^6$ .......................... C25B 9/00; G01N 27/406
[52] U.S. Cl. ..................... 204/270; 204/130; 204/242; 204/267; 204/277; 204/278; 204/421; 204/424; 204/427
[58] Field of Search .................... 204/130, 421–429, 204/153.18, 242, 269, 270, 267, 275–278

[56] References Cited

U.S. PATENT DOCUMENTS

| | | | |
|---|---|---|---|
| 587,437 | 8/1897 | Hurter | 204/268 |
| 832,983 | 10/1906 | Kother | 204/268 |
| 1,402,326 | 5/1977 | Pollner et al. | 204/429 |
| 1,422,113 | 9/1980 | Kimura et al. | 204/153.18 |
| 3,216,911 | 11/1965 | Kronenberg | 204/153.18 |
| 3,400,054 | 9/1968 | Ruka et al. | 204/153.18 |
| 3,514,377 | 5/1970 | Spacil et al. | 204/153.18 |
| 3,554,808 | 1/1971 | Fischer et al. | 429/32 |
| 3,650,920 | 3/1972 | Hickam et al. | 204/130 |
| 3,699,032 | 10/1972 | Rapp | 204/153.18 |
| 3,773,641 | 11/1973 | Fitterer | 204/423 |
| 3,843,400 | 10/1974 | Radford et al. | 204/421 |
| 3,960,500 | 6/1976 | Ross et al. | 204/153.18 |
| 4,128,433 | 12/1978 | Manning | 204/427 |
| 4,174,260 | 11/1979 | Schmidberger | 204/260 |
| 4,246,081 | 1/1981 | Winnick | 204/130 |
| 4,253,925 | 3/1981 | Mason | 204/130 |
| 4,272,329 | 6/1981 | Hetrick et al. | 204/153.18 |
| 4,356,065 | 10/1982 | Dietz | 204/153.18 |
| 4,477,541 | 10/1984 | Fraioli | 429/33 |
| 4,487,680 | 12/1984 | Logothetis et al. | 204/426 |
| 4,505,790 | 3/1985 | Mase et al. | 204/130 |
| 4,659,448 | 4/1987 | Gordon | 204/277 |
| 4,725,346 | 2/1988 | Joshi | 204/130 |
| 4,879,016 | 11/1989 | Joshi | 204/424 |
| 4,908,113 | 3/1990 | Marianowski et al. | 204/245 |
| 5,021,137 | 6/1991 | Joshi et al. | 204/130 |
| 5,022,975 | 6/1991 | Gordon | 204/277 |

*Primary Examiner*—T. Tung
*Attorney, Agent, or Firm*—Trask, Britt & Rossa

[57] ABSTRACT

A process and system for removing trace amounts of oxygen as an impurity in inert gases is disclosed. The process and system involve an electrochemical cell containing an oxygen ion transporting, solid state metal oxide electrolyte having a high thermodynamic potential and having only one thermodynamically stable valence state for the metal ion component of the electrolyte. The electrolyte is coated with a perovskite anode and a metallic cathode. Operation is conducted at high voltages, e.g., 1.5 volts and above, at elevated temperatures. Purification of inert gases to an oxygen content of about 1 ppm is readily achievable.

4 Claims, 3 Drawing Sheets

INERT GAS PURIFYING SYSTEM

RELATED APPLICATIONS

This patent application is a continuation-in-part of patent application Ser. No. 07/842,920 filed Feb. 28, 1992, now abandoned, which is a continuation-in-part of patent application Ser. No. 07/710,128 filed Jun. 4, 1991, now U.S. Pat. No. 5,378,345.

BACKGROUND OF THE INVENTION

1. Field

The instant invention relates to processes and systems for removing oxygen from gas streams through the use of a solid state oxygen ion conducting electrolyte. The invention particularly relates to the removal of trace amounts of oxygen as an impurity from inert gas streams.

2. State of the Art

Since the formulation of the Nernst equation in about 1890, it has been known that certain solid metal oxides such as zirconium oxide transported oxygen ions in a relationship to the voltage applied across the electrolyte or, in other words, that a partial pressure differential of oxygen across the electrolyte generated a certain voltage potential. The Nernst equation is stated as follows:

$$E = -\frac{RT}{ZF} \ln \frac{P_2}{P_1} \quad \frac{P_2 \text{ (unknown)}}{P_1 \text{ (reference)}}$$

Since the developments of Ruka and others in the 1960's relating to zirconium oxide, particularly with respect to fuel cells but also with respect to the ability of zirconia to act as an oxygen concentration sensor and transporter of oxygen ions, it has been known that pure oxygen could be delivered by an applied voltage to an electrolyte to separate oxygen from air or other gases. In this regard, see Ruka patent, Re 28,792 (1976).

The technical issues which remain even to the present day is how to bring about an efficient transport of oxygen across an oxygen ion conducting electrolyte, especially when the concentration of oxygen in the inlet gas stream is very low.

The earlier patents and applications of the instant inventors of which this is a continuation-in-part, taught various effective electrode-electrolyte systems for enhancing the transport of oxygen and overcoming some of the innate technical problems associated with such things as proper adherence of electrodes to electrolytes to minimize power loss at the electrode-electrolyte interface, to optimize electrode compositions so that effective current distribution occurred and to select the proper electrodeelectrolyte combinations to optimize electrical efficiency and oxygen ion transport.

In a recent patent, U.S. Pat. No. 5,035,726 assigned to Air Products, a system is described wherein argon containing oxygen as an impurity is pressurized to 30–80 psig and placed in contact with an electrolyte to remove the oxygen. The operation of electrolytes under increased pressure is known from the Nernst equation and there is no data in the Air Products patent to indicate any particularly effectiveness achieved by the stated pressure ranges in comparison with atmospheric pressure operation.

The Air Products patent further notes the use of a sweep gas at the anode side of the gas purifier to reduce the partial pressure of oxygen contained therein. This is done, according to the patent, to reduce the partial pressure differential between oxygen as a trace amount in the inert gas versus the oxygen concentration at the anode side. This, of course, would be expected from knowledge of the Nernst equation. To follow this to its logical conclusion, however, pure sweep gas, that is, containing no oxygen, would have to be swept pass the anode side at the same volumetric rate as the argon on the cathode side in order to create an equivalent partial pressure of oxygen on each side of the electrolyte. Thus, a very large amount of pure sweep gas would generally have to be utilized.

In the Air Products patent, generally the operation was conducted at a voltage of less than about 0.3 volt across the electrolyte. Operation at such low voltages will generally require a great deal of surface area of electrolyte in order to reduce significantly trace amounts of oxygen in an inert gas. Also, at such low voltages, the reductions of the trace amounts to very low levels will not generally be practicable.

Generally, within the inert gas industry it is preferred that oxygen impurities be less than 5 ppm and preferably as low as about 1 ppm. Such low requirements of oxygen in an inert gas means that regardless of whether a sweep gas or other system is used to lower oxygen concentration at the anode side of solid state electrochemical cell, oxygen is being driven from a region of very low concentration at the cathode to a region with a much higher concentration at the anode.

SUMMARY OF THE INVENTION

The instant invention involves a process and system for removing trace amounts of oxygen impurity from an inert gas by means of an electrochemical cell having an ion conducting electrolyte which is thermodynamically stable under relative high temperatures and operating voltages. Electrochemical cells suitable for this purpose have a cathode chamber with an inlet for inert gas containing oxygen impurity and an outlet for the purified inert gas. It also includes an anode chamber with a discharge for oxygen transported across an electrolyte which separates the cathode and anode chambers.

The surface of the electrolyte facing the anode chamber has an anode coating adherent on the electrolyte surface, said anode preferably containing a significant quantity of a perovskite material such as lanthanum strontium manganite or lanthium strontium cobaltite or the like in conjunction with an appropriate current collector such as a silver metal coating which may be a complete overcoat over the cathode or may be present in a grid pattern to distribute efficiently current over the whole anode surface. A cathode coating adherent to the electrolyte surface faces the cathode chamber. It is preferably a cermet material such as a nickel zirconia or the like inasmuch as the perovskite materials, under the application of high voltage in oxygen poor environment that is present at the cathode under the influence of high temperatures and high voltages tends to decompose. Thus, it is generally preferred that the anode be of a different composition than the cathode for best removal of oxygen from an inert gas stream.

The process and system of this invention preferably employs an electrochemical cell with means to apply a relatively high voltage across the electrolyte, that is, a voltage of at least about 1.25 volts and preferably at about 1.4 or even 1.5 volts and above. Voltages as high as 2.0 volts and above can be effectively used. Such high voltages are generally necessary if it is desired to remove substantially all the oxygen from an impure inert gas stream in a realistic time period with a reasonable electrolyte surface area.

The electrochemical cell of this invention is generally operated at a temperature of above about 600° C. and preferably at about 700° C. and above. Preferred electrolyte materials are zirconia, hafnia and thoria, all of which have excellent thermodynamic stability at the high temperatures and voltages applied. While electrochemical cells composed of ceria and bismuth oxide operate very efficiently from an energy standpoint, they are generally not sufficiently thermodynamically stable to be used effectively for the removal of oxygen down to the level of 5 ppm or below.

In the event an inert gas stream has a relatively high oxygen impurity content, for example, 2 to 5% oxygen, then a ceria or bismuth oxide electrochemical cell may be used as a first stage to efficiently reduce the oxygen content of the inert gas stream down to an oxygen content in the range of about 5000 ppm. It will then be required to use an electrochemical cell of the type described herein which has high voltage capability to remove the last traces of oxygen to produce an inert gas stream, for example, nitrogen or argon, having an oxygen content below about 5 ppm.

Argon, as well as nitrogen, is an important industrial gas with a wide range of applications and uses. The major source of Argon is as a by-product of cryogenic air separation plants utilized for producing oxygen and nitrogen. Due to the closeness of the boiling points of argon and oxygen, significant quantities of oxygen are present in the argon gas product. The current commercial method for further purification of argon gas is to remove the oxygen by catalytic reduction to water by injection of hydrogen gas over platinum catalyst beds followed by drying to remove the water. This process is referred to as the "Deoxo Process" and has significant disadvantages relative to the present invention. First, a considerable safety hazard of explosion exists when reacting hydrogen and oxygen. In addition, cost of production is increased by having to dry the gas after reaction and by requiring the use of hydrogen gas. Other alternate processes have been proposed utilizing aluminosilicate zeolites and molecular sieves; however, these processes are not capable of achieving the desired high purities.

DETAILED DESCRIPTION OF THE PREFERRED EMBODIMENT

Figure 1:
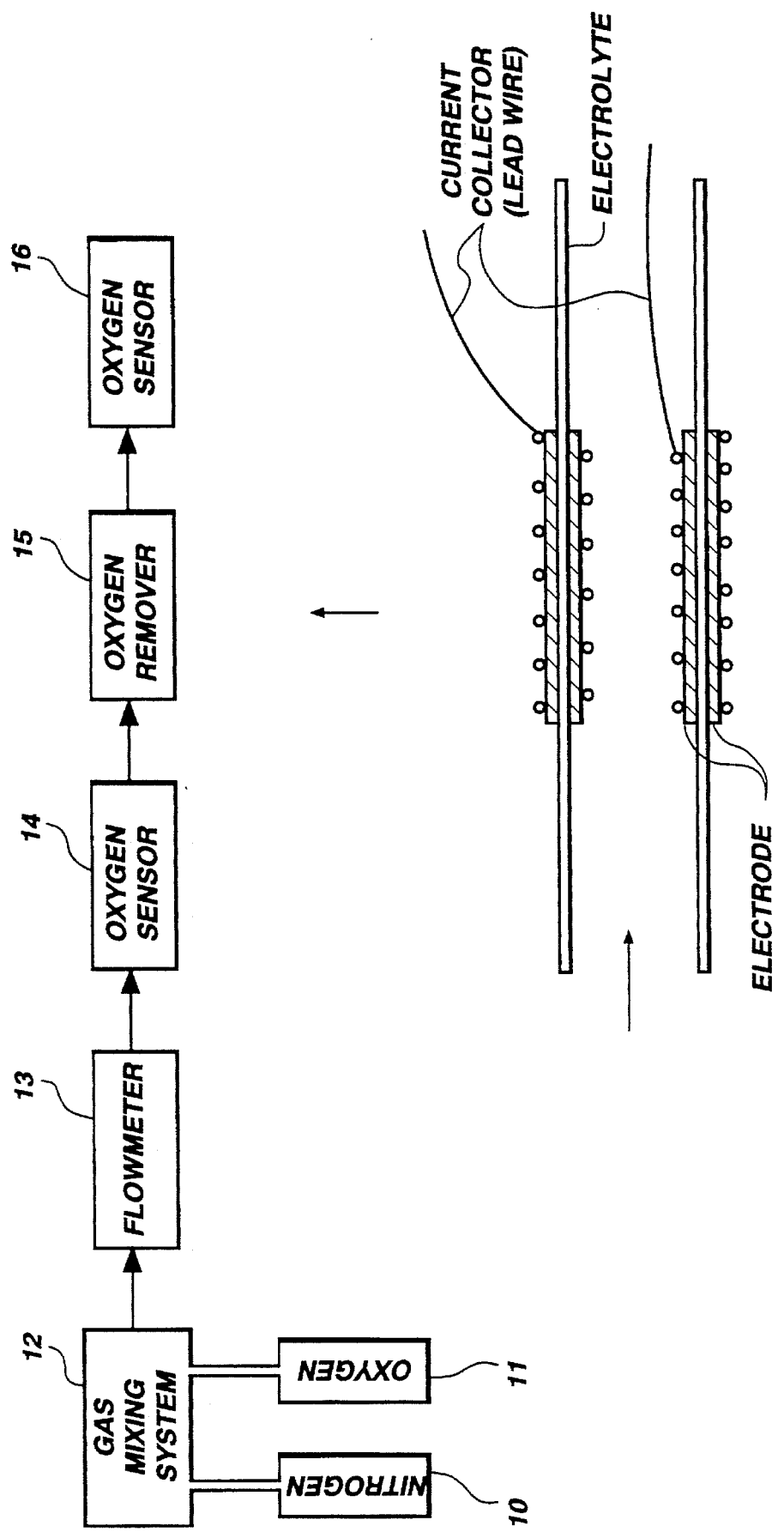
FIG. 1 is a schematic illustration of apparatus utilized in performing various tests of the instant invention.

A process and system, i.e. apparatus, are disclosed to achieve highly efficient oxygen removal from a gas stream by utilizing a solid oxide oxygen ion conductor having thermodynamic stability when subjected to high voltages at high temperatures. The process and system are useful for purification of impure inert gases such as argon and nitrogen in which oxygen is present in trace amounts as the impurity. Particularly useful oxygen ion transport membranes having the desired thermodynamic stability are ceramic metal oxides such as zirconia, hafnia, thoria, and the like. Such electrolytes with electrodes are disclosed and described in U.S. Pat. Nos. 4,725,346, 4,879,016 and 5,021,137 infra, the description of each being incorporated herein by reference.

The present invention involves an electrochemical cell which utilizes a solid, non-porous electrolyte membrane coated with electronically conductive electrodes. The cell is heated to high temperatures and is subjected to a high applied DC potential. In so doing, oxygen gas, as an ion, is transported through the electrolyte membrane thereby removing it from an undesirable location. In performing this operation, there are certain optimal operating conditions and materials for achieving the highest possible efficiency. First, is the choice of the electrolyte material, the most preferred being zirconia with hafnia and thoria also being particularly useful. The key property of the electrolyte material is that it have a high thermodynamic decomposition potential, i.e. the electrolyte must be stable under the influence of high voltages at elevated temperatures. Zirconia, as well as hafnia and thoria, have such stability. In addition, the metal ion in the electrolyte should only have one thermodynamically stable valence state in order to prohibit electron transfer by reduction of metal ion. This may occur in some solid oxide electrolytes such as ceria where a 4+ valence to 3+ valence transition may occur at high operating voltages, resulting in electronic shorting of the ion conducting electrolyte, which result in very little, if any, conduction of oxygen ions.

The electrolytes disclosed in the patents incorporated hereinabove by reference are especially useful in this invention. These are non-porous, solid electrolytes of zirconia, hafnia or thoria having high thermodynamic stability so that oxygen ions are conducted without any electronic conduction occurring. Electronic conduction is a "short-circuit" so that electrons preferentially transport (conduct) rather than oxygen ions. The characteristic of an electrolyte to conduct only ions is described by transference number, which at a value of 1.0 is a pure ionic (non-electronic) conductor. Transference numbers <1.0 indicate electronic conduction, e.g. a transference number of 0.5 represents 50/50 ion/electronic conduction.

The electrolytes utilized in the instant invention are ones which contain essentially no contaminants or ingredients which have the effect of lowering the transference number below 1.0. Thus, the presence of doping agents known to lower the transference number is to be avoided. Such doping agents include niobium, iron, cobalt, nickel, titanium, tantalum, chromium and the like. Also, ions having multiple valence states, such as ceria, lower the transference no. of zirconia. Gordon, U.S. Pat. No. 5,022,975 (1991) at Col. 26, lines 44 et seq.; col. 27 lines 1 et seq. disclose ingredients and methods for lowering the transference no. of a zirconia electrolyte. This information is incorporated herein by reference.

The preferred electrolytes of the instant invention are homogeneous in structure, having essentially the same chemical composition throughout the electrolyte. Doping agents to achieve stabilization as to enhance ionic conductivity may, of course, be utilized and, in many instances, are preferably included. Doping agents of this type include yttria, yterbia and the like.

Further, as indicated herein, the preferred temperature of operation of the oxygen removal electrolytic unit of the instant invention is at temperatures of 700° C. and above and especially 750° C. to 800° C. or even higher, requires a very thermodynamically stable electrolyte.

Valence and thermodynamic stability are important properties of the electrolyte material because the most efficient oxygen removal condition to obtain low ppm levels occurs at high operating voltages just below the thermodynamic decomposition voltage. In a zirconia-based device, this voltage range is between 1.5 VDC and 2.2 VDC, depending upon the temperature of operation. In the case of ceria, a voltage in this range would result in electrical shorting, i.e. electronic conduction, of the electrochemical cell thereby making it a very inefficient electrolyte. Thus, ceria has to be run at a much lower operating voltage, which is very inefficient for removing trace amounts of oxygen from an inert gas feed stream.

However, it is important to realize that ceria is less efficient only under the circumstances where a high applied DC voltage is advantageous. In cases where a low operating voltage is acceptable, ceria is generally the electrolyte of choice because of its higher ionic conductivity than zirconia. An example of such a situation would be in the design of a multiple stage system in which the gas to be purified would first be passed through a cell containing a ceria electrolyte whereby the oxygen content in the gas would be removed to a level of 0.5–0.1% oxygen. This part of the process can be efficiently performed at low operating voltages (<1.0 VDC) and ceria would be the preferred electrolyte, although bismuth oxide also has a high ionic conductivity. Stabilization of bismuth oxide has generally been a problem, although recent advances such as those disclosed in U.S. Pat. No. 5,006,494 to Virkar may make bismuth oxide a more acceptable electrolyte. The final stage of purification could then be performed by a system utilizing a zirconia electrolyte under a high applied voltage to remove the oxygen content in the inert gas being treated to a level of <1 ppm.

The important engineering principle here is that removal of oxygen from an inert gas to a level of less than 1 ppm is most efficiently done at high operating voltages. The reason for this is that the impressed voltage is essentially the sole driving force for oxygen removal, and in conditions where the oxygen level in the impure inert gas is very low, e.g. <1000 ppm, the process is most effective when a very large driving force, i.e. high voltage, is present. Under these conditions, the diffusion of oxygen through the porous electrode and the adsorption of oxygen at the triple point become the rate-limiting steps of the process. These processes occur more efficiently under high operating voltages due to the energy required to drive these processes. (The triple point is at the interface between the electrode and electrolyte where oxygen dissociation occurs at the cathode-electrolyte interface and oxygen ion transport begins under the influence of a voltage potential. The reverse process occurs at the anode-electrolyte interface.)

Impression of voltages from about 1.5 volts to a voltage just below the thermodynamic decomposition of the electrolyte is effective to obtain maximum transport of oxygen ions across the electrolyte. Voltage levels at or above the decomposition voltage are detrimental, generally, to efficient oxygen ion transport as well as to the structural integrity of the electrolyte.

An additional key feature of the present invention is the electrode system. As described above, the porosity of the electrode (i.e. structure to permit diffusion of oxygen through the electrode) and the adsorption of molecular oxygen at the triple point become very important at very low ppm levels of oxygen in the cathode chamber. These characteristics determine overall efficiency and are a function of electrode performance as well as applied voltage (driving force). Also, the electrode sheet resistance strongly influences overall electrical efficiency. The present invention solves this problem by utilizing different electrodes for the cathode and anode.

Part of the electrode system, specifically the anode, uses high efficiency electrode system previously disclosed in U.S. Pat. Nos. 4,725,346, 4,879,016 and 5,035,726. An example of a preferred anode electrode would be a Lanthanum strontium manganite electrode layer overcoated by a conductive metal, e.g., silver, current collector layer. This electrode functions just as it would in an oxygen pump which is why this type of electrode is preferably utilized. In the case of the cathode the oxygen pump type electrode is not adequate for oxygen removal applications to obtain low ppm levels of oxygen in the purified inert gas. Therefore, semiconducting oxide such as LSM, LSCo, LSC, etc. are not suitable because they have been observed to start decomposing during operation in such low oxygen environments. The cathode electrode system needs to have properties similar to the type of electrodes used for anodes in solid oxide fuel cells. Specifically, it needs to be chemically stable in environments having a very low oxygen partial pressure. Examples of suitable cathode materials include nickel-zirconia and copper-zirconia cermets, platinum or metallic electrodes (Pd, Au, Ag, etc.), and "n" type semiconducting oxides such as doped $TiO_2$.

An additional feature that is incorporated in the cathode electrode system to improve the effectiveness of devices of this invention is a component that acts as an oxygen getter. Examples of preferred oxygen getters include Cu, Ti, Ni, etc. These function to grab oxygen from the gas stream by oxidation and are then reduced back to the metal by the applied voltage on the electrochemical cell. The result of this characteristic is that the electrochemical cell behaves as though it has a higher surface area than it actually has, thereby increasing it's ability to remove oxygen from a gas stream that is very low in oxygen content.

At very low oxygen concentrations, for example, less than 1% $O_2$ and especially at less than 500 ppm (<0.05%), any molecular oxygen reaching the cathodeelectrolyte interface must diffuse through relatively stagnant columns of inert gas in the pores of the cathode. Increasing the porosity of the cathode tends to decrease its electrical efficiency by, among other things, increasing the sheet resistance of the cathode. Thus, the use of readily oxidizable metallic oxygen getters improves the ability of the cathode to absorb oxygen, thereby improving the effectiveness of the cathode in transporting oxygen to the triple point while not adversely interfering with other desirable electrical properties of the cathode. Oxygen getters are present in the cathode in quantities from about 5% to 50% by vol. and preferably from about 20% to about 30%.

There is an additional aspect to this device that relates to what has been described above with regard to oxygen getters. In the case of copper as a getter, the copper is oxidized to copper oxide by oxygen in the inert gas stream and then reduced to copper metal by the electrochemical cell. The electrochemical cell creates a reducing condition that is strong enough to reduce solid oxides to a metallic state. In the same way, gaseous oxide species present in the inert gas such as $H_2O$, NO $CO_2$, $SO_2$, etc. can also be reduced by stripping the oxygen from the molecule. This aspect of this device may find other applications in metal refining or pollution control systems. Theoretically, any solid or gaseous oxide compound can be stripped of it's oxygen component if it's thermodynamic decomposition potential is lower than that of the electrolyte (i.e. zirconia).

This phenomenum contributes to the effectiveness of this device as an oxygen removal system for purifying argon and nitrogen gases. Most gases that are being purified of the oxygen component in the gas will also contain trace amounts of water vapor. While the electrochemical cell of this invention is removing free oxygen from the gas stream, if the applied voltage is high enough to decompose water, then this will also occur. Thus, oxygen stripped from the water vapor is transported through the electrolyte while leaving hydrogen gas in the gas stream. This hydrogen will then continue to react with any free oxygen available thereby enhancing the desired process of oxygen removal. Similar to the performance of a copper getter, this tends to be improve performance of the device causing it to behave as if it had a higher active surface area.

In the design of a large scale system for oxygen removal it was previously suggested hereinabove that a two stage system may be the optimum design. In the case where ceria is the electrolyte for the first stage, the oxygen level may be removed down to levels of 0.5–1.0%. It is important to note that the electrode systems developed for the oxygen pump (both anode and cathode) described in U.S. Pat. Nos. 5,021,137, 4,879,016 and 4,725,346 are suitable for this electrochemical cell.

It is only in the zirconia electrolyte stage where the oxygen content is desired to be reduced to a ppm level of <500 ppm, especially <100 ppm and particularly at levels approaching 1 ppm, that the specially-designed cathode/electrolyte/anode combination of this invention is most advantageously used. This two stage system is significant in systems that are large enough that the total power consumption is an important consideration.

The high efficiency electrolyte/electrode system previously disclosed in U.S. Pat. No. 5,021,137 makes this two stage system more cost effective with respect to total power consumption. For example, if the source gas contains above 5% oxygen, then by removing oxygen to 1% concentration using a ceria-based system having high electrical efficiency to remove 80% of the oxygen present by the highest efficiency system possible and to remove the remaining 20% with a lower electrically efficient system which can act rapidly through the use of a minimal amount of thermodynamically stable electrolyte, e.g. zirconia, under the influence of a high voltage potential, then a cost effective system from both a competent investment standpoint and operations standpoint is achieved.

Operation at such high voltage potentials using the preferred electrode-electrolyte systems described herein results in a system having minimal electrolyte area, thereby reducing the size, cost and difficulty of construction of a unit used to remove trace amounts of oxygen from an inert gas such as oxygen or argon. In large scale systems this additional design complexity can be easily justified by the energy savings.

Experiments were conducted with different cells at various flow rates of inert gas, oxygen content, applied voltages, electrolytes and the like. The experimental apparatus utilized is illustrated in FIG. 1. The apparatus included a source of inert gas (nitrogen) and oxygen, via cylinders 10 and 11, respectively whereby the oxygen may be mixed in a mixing valve 12 with nitrogen, for example, to obtain various flow rates, as determined by flow meter 13, of various concentrations of oxygen in nitrogen. The concentration is detected with an oxygen sensor 14 before the gas mixture enters an electrochemical cell 15 designed, structured and operated to remove oxygen from the inert gas stream. A zirconia oxygen sensor 16 senses the concentration in the inert gas stream exiting from the cathode chamber of the electrochemical cell 15 in order to determine the amount of oxygen removed by the electrochemical cell.

The instant invention is especially advantageous as a process and system for removing trace amounts of oxygen, e.g. oxygen contents of about 5% or less and especially below 1%, for example, less than about 500 ppm, from inert gas streams such as argon and nitrogen. In situations where the oxygen content is significant, e.g. from 1 to 5%, the invention can produce a significant quantity of pure oxygen at the anode discharge outlet. Thus, by pumping the oxygen away from the anode surface the saturation of the surface with oxygen can be prevented, thereby enhancing operation of the system while recovering pure oxygen gas as a product stream. Pure oxygen is a desirable product from cryogenic distillation plants so that the oxygen recovered from impure nitrogen and argon has significant value.

The following examples describe various experiments conducted.

Example 1

Figure 2:
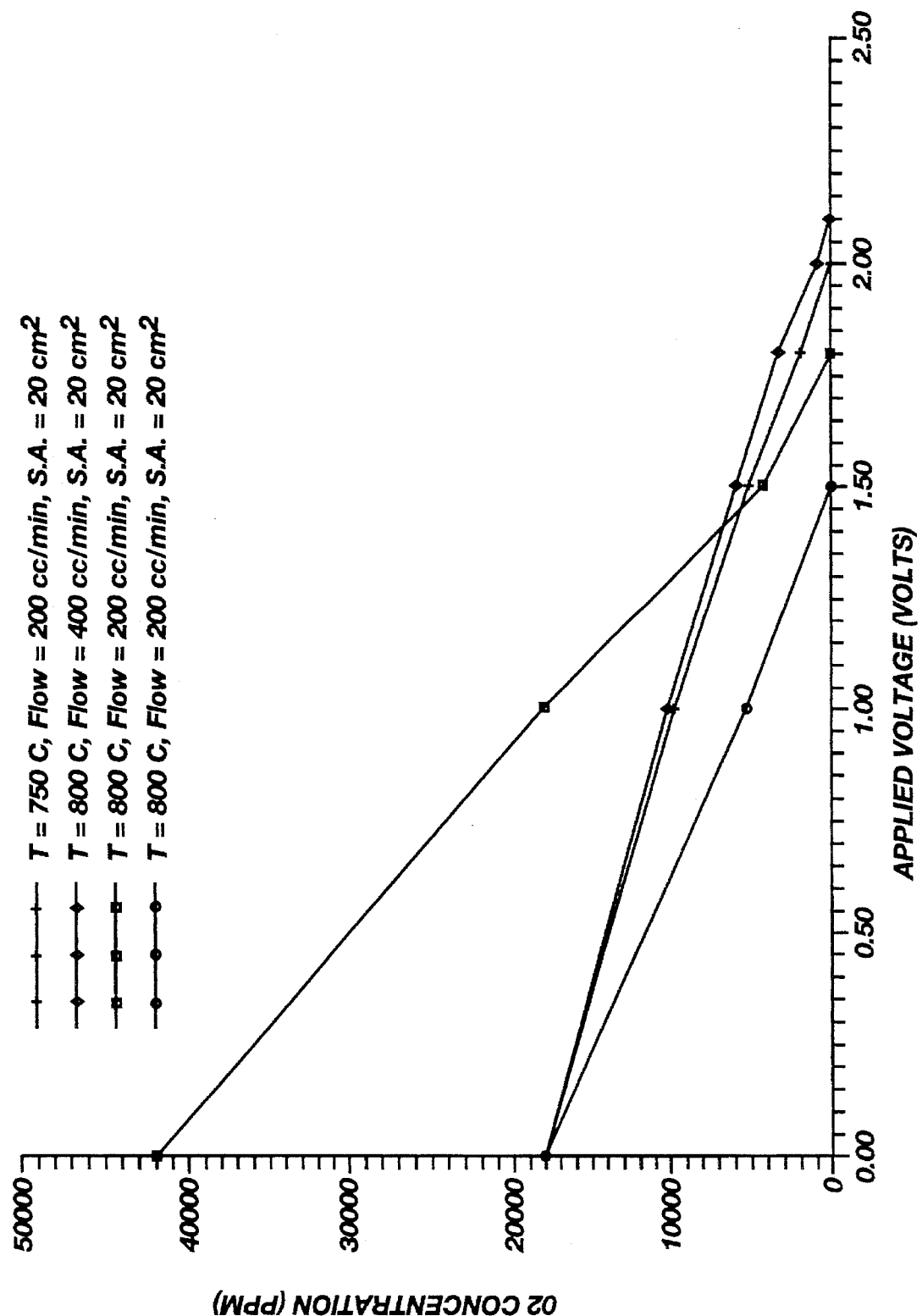
FIG. 2 is a graph illustrating the effectiveness of high voltage operation of the system of the instant invention.

A series of experiments were conducted at the flow rates, voltages and concentrations set forth in FIG. 2, which is a graph illustrating the effectiveness of a zirconia electrolyte (zirconia doped with 8 mole % of yttrium having an area of 20 $cm^2$ with a perovskite anode and a platinum cathode operated at a temperature of 750° C. at a flow rate of 200 cc/min. and at temperatures of 800° C. for flow rates of 400 cc/min. and 200 cc/min. In all of these experiments the cathode was a coating of platinum, 10 to 30 microns thick, preferably about 20 microns. The electrode was applied by brush using a platinum ink and firing the ink between 900°–1200° C., preferably about 1000° C. A silver wire was attached to the platinum electrode using platinum ink, and firing the wire and ink to a temperature of 900° C. The anode was formed by brushing an LSM layer over the outer surface of the electrolyte and firing the LSM to 1100°–1300° C., preferably 1200° C. This layer is 10–20 microns thick, preferably 15 microns. On top of this a silver ink is brushed on to the LSM layer and fired to a temperature between 700–900° C., preferably 800° C. Finally, a silver wire is attached to the silver wire and silver ink is applied by brush to diminish contact resistance. This silver ink is then fired to 800° C. Voltages applied were about zero, 1.0, 1.5, 1.8 and 2.0 volts. The oxygen content of the feed stream was about 1.8% for three of the experiments and about 4.2% for an experiment at 800° C. and 200 cc/min.

At 1.8% oxygen in the starting gas all detectable oxygen is removed at 750° C. for a flow of 200 cc/min at a voltage of 2.0 volts. The same cell can handle 400 cc/min by increasing the temperature to 800° C. and reduce detectable oxygen to zero at a voltage approaching 2.0 volts.

By increasing the temperature from 750° C. to 800° C. and holding flow constant at 200 cc/min., the oxygen concentration removed can be increased from 1.8% (@750° C.) to 4.2% (800° C.).

Thus, in both cases the advantage of operating at a higher temperature is demonstrated. Effectively, twice as much oxygen can be removed by increasing the temperature from 750° to 800° C. This is demonstrated by either doubling the flow or doubling the oxygen concentration at the same flow.

The graph also indicates at the condition with temperature of 800° C., flow 200 cc/min, and oxygen concentration of 1.8% that all the oxygen can be removed at a voltage of 1.4–1.5 VDC. This experiment in combination with the other three shows that in optimizing the design of a system by operating at higher temperatures and voltages more oxygen can be removed per unit surface area. Thus, a smaller system can be built to handle high flow and high oxygen concentration by maximizing temperature and operating voltage as opposed to operating at lower temperature and voltages where more surface area would be required to remove an equivalent amount of oxygen.

mise being to increase the power on stage 1 from 6.31 KW to 12.62 KW.

Two stage oxygen removal
Total flow: 3500 liter/min.
Oxygen concentration: 1.8% in inlet feed
Stage 1: $CeO_2$—CaO T=800° C. in nitrogen
Stage 2: $ZrO_2$—$Y_2O_3$ T=800° C.

| Stage | In/Out (ppm) | O2 Removed | Area | Applied Voltage | Power |
| --- | --- | --- | --- | --- | --- |
| 1 | 18,000/1,000 | ~59.5 l/m | 140,000 cm$^2$ | 0.4 VDC | 6.31 KW |
| 2 | 1,000/0.1 | ~3.5 l/m | 35,000 cm$^2$ | 2.1 VDC | 1.95 KW |

Total Power: 8.26 KW

EXAMPLE 2

Another experiment was conducted with a similar electrochemical cell to that used in Example 1. Example 2 is a calculation of what a typical oxygen removal system would be like based on the data generated in Example 1. This example is for a single stage system based entirely on zirconia and is demonstrating a small scale industrial size unit.

Single stage oxygen removal
Total flow: 3500 liter/min.
Oxygen concentration: 1.8% in feed gas
Temperature of operation: 800° C.
Oxygen removed: 63 liter/min.
Surface area: 175,000 cm$^2$
Current: 16,711 amps
Applied voltage: 2.1 VAC
Power consumption: 35 KW

EXAMPLE 3

Figure 3:
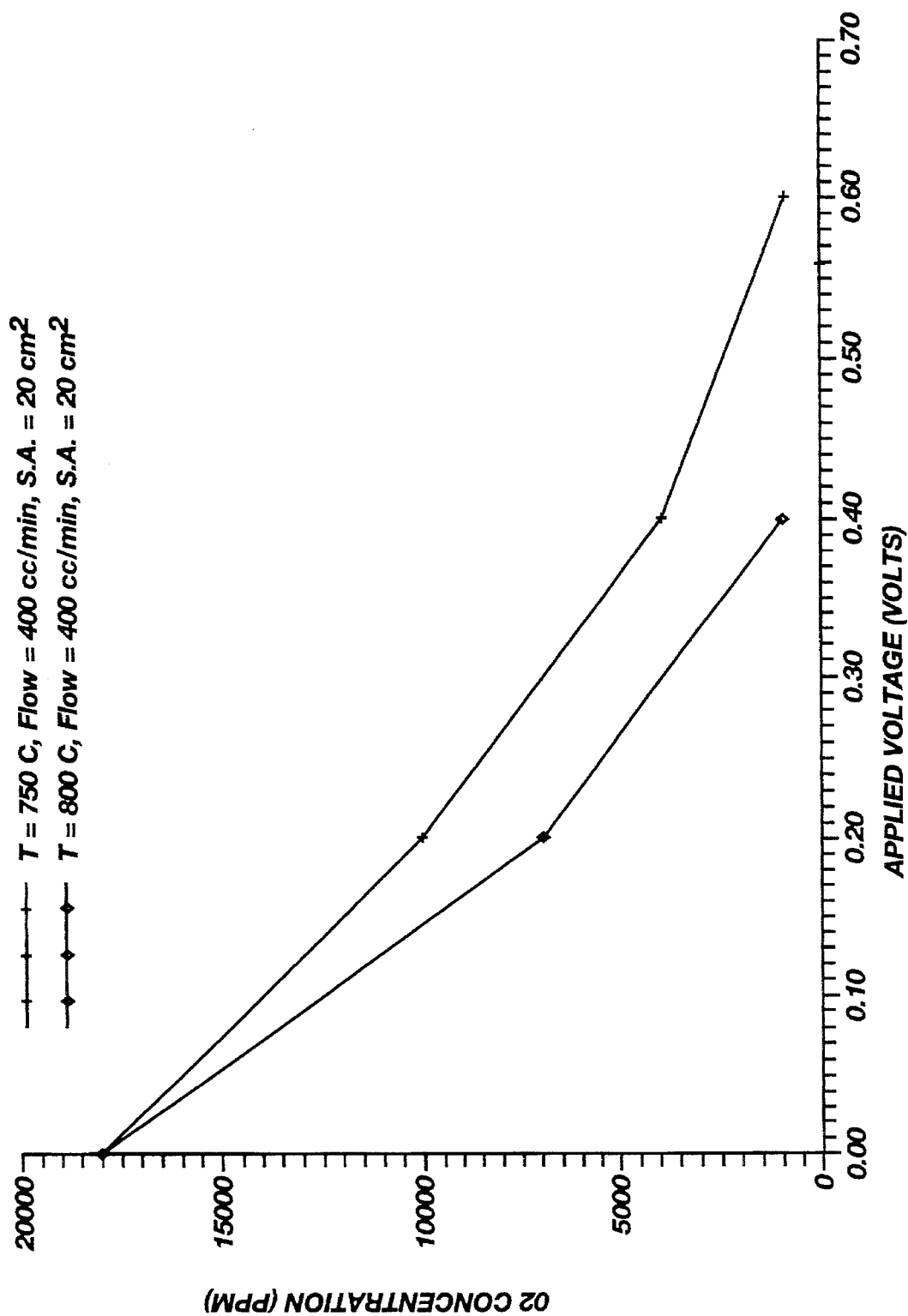
FIG. 3 is a graph illustrating the oxygen removal capability of a first-stage ceria electrolyte unit at relatively low voltages.

Example 3 is a calculation of a two stage oxygen removal system the same size as that demonstrated in Example 2. Here a first stage removal is performed to a level of 0.1% oxygen utilizing a ceria electrolyte system. The calculation for this part of the system is based on the data shown in FIG. 3. In this experiment 12 mole % calcia doped ceria electrolyte was coated on both inner and outer surfaces with an LSCo electrode. The electrode layer was 10 to 20 microns thick, preferably 15 microns, and was fired to a temperature between 1050°–1200° C., preferably 1125° C. on the top of both electrodes a silver current collector was applied by brushing on a silver ink and firing it to 750° C. The silver current collector layer is 5 to 15 microns thick, preferably 10 microns. The calculation for the second stage system comprised of a zirconia electrolyte is based on the same data used in Example 2.

Example 3 demonstrates the improved system efficiency obtained by utilizing a two stage system. In this case the overall size of the system has been kept constant (i.e. total surface area of 175,000 cm$^2$). However, the total power consumption has been decreased from 35 KW to 8.26 KW. This shows the effect of utilizing ceria as part of a two stage system and now depending upon customer requirements, a system can be designed to optimize total cost, size (i.e. surface area), and power consumption. For instance, the size of the stage 1 ceria system could be cut in half (e.g. 140,000 cm$^2$ to 70,000 cm$^2$) by doubling the voltage, the compro- In the above examples the anode was exposed to air (~28% $O_2$). Reducing the oxygen content at the anode to very low levels facilitates the transport of oxygen across the electrolyte, however, the principal driving force is the electromotive force applied to the electrolyte. Reducing the oxygen content at the anode to a value approaching zero will reduce the applied voltage only by a value of about 0.2 VDC to accomplish the same oxygen transport across the electrolyte. Thus, because a very high electromotive force is required in the instant invention to reduce effectively the oxygen content of an impure inert gas to a value of approximately 5 ppm or lower, the saving of a minor amount of power by expending energy to reduce the oxygen content at the anode may not be worthwhile technically or economically. If a sweep gas is used, it must be heated to the operating temperature of the cell, which would probably require more energy than the energy saved in reduced voltage. The preferred manner of reducing the partial pressure of oxygen at the anode is by mechanically or otherwise pumping the oxygen away from the anode and recovering pure oxygen.

While the instant invention has been particularly described as being very effective in the removal of oxygen from inert gas streams, it can be used for the removal of oxygen from a variety of gas streams, especially if the objective is to remove essentially all of the oxygen from such gas stream.

The instant invention, especially through use of a two stage system of the type described hereinabove may be used to produce pure nitrogen and pure oxygen from air. This can be particularly advantageous in locations wherein the quantity of pure $N_2$ and $O_2$ required are too low to justify the expense of a cryogenic separation unit or where it is inconvenient to try to supply small amounts of pure inert gas, i.e. $N_2$ with traces of argon and other inert gases, and pure oxygen. Also, such systems can be readily made to be portable, e.g. suitcase size or larger, such as a small vehicle trailer mounted system.

The instant invention can be effectively used also to remove trace amounts of oxygen from gases such as hydrogen and steam. Thus, the instant invention can purify an impure hydrogen stream or can act as a steam hydrolyzer to produce pure hydrogen and pure oxygen.

In the instant invention, platinum is the preferred cathode material. It is applied in a manner to obtain a porous, open structure to permit ready infusion of oxygen containing inert gas to the cathode/electrolyte interface. Although silver is preferred in many instances because of its impermeability to oxygen even in a non-porous condition and its excellent electrical conductivity (low sheet resistance), silver tends to diffuse through microcracks which form in the electrolyte during extended operation. This tendency of silver to diffuse is greater where it is used in the cathode and especially at very high temperature, e.g. above 750° C., and under conditions of high electrical flux, e.g. >1.5 VDC, tending to drive the silver into the electrolyte.

A silver current collector can be used as a mesh, grid or other configuration in adherent contact or other good physical contact with the exposed surface of the cathode.

Many variations and modifications may be made to the instant invention without departing from the spirit of the invention and the scope of the appended claims.

What is claimed is:

1. A combination of electrochemical cells for removing oxygen as an impurity from inert gases, comprising:

a first electrochemical cell comprising
      a cathode chamber having an inlet for oxygen-contaminated inert gas and an outlet for semi-purified inert gas,
      an anode chamber having an outlet for oxygen gas,
      a solid, non-porous oxygen ion conducting electrolyte consisting essentially of ceria,
      a porous cathode coating containing perovskite metal oxides adherent to said electrolyte,
      a porous anode coating containing perovskite metal oxides adherent to said electrolyte,
      metallic current collectors adherent to the exposed surface of said cathode and anode;
   a second electrochemical cell comprising
      a cathode chamber having an inlet communicating with the outlet for semi-purified gas from the cathode chamber of said first electrochemical cell, said second electrochemical cell cathode chamber having an outlet for purified inert gas,
      an anode chamber having an outlet for oxygen gas,
      a solid, non-porous ceramic metal oxide electrolyte separating said cathode chamber from said anode chamber, said electrolyte having a high thermodynamic decomposition potential at elevated temperatures and said metal having only one thermodynamically stable ionic valence state,
      a porous cathode coating adherent to said electrolyte, said cathode being in said cathode chamber and consisting essentially of an electronically conducting metal, metal-cermet or a "n" type semiconducting oxides,
      a porous anode coating adherent to said electrolyte, said anode being in said anode chamber and comprising perovskite metal oxide electrode, and
      metallic current collectors adherent to the exposed surface of said cathode and said anode.

2. The electrochemical cell combination of claim 1, wherein said first electrochemical cell has means for imposing a voltage of up to about one volt across said electrolyte.

3. The electrochemical cell combination of claim 1, wherein said second electrochemical cell has means for imposing a voltage of at least about 1.5 volts across said electrolyte.

4. The electrochemical cell combination of claim 1, wherein the electrolyte surface area of said first cell is larger than that of said second cell.

* * * * *